United States Patent [19]

Smith et al.

[11] 4,126,909
[45] Nov. 28, 1978

[54] TORSION HOLD-DOWN

[75] Inventors: Vernon O. Smith, Ashley; Ronald E. Abbott, Marion County, both of Ohio

[73] Assignee: Overhead Door Corporation, Dallas, Tex.

[21] Appl. No.: 820,307

[22] Filed: Jul. 29, 1977

[51] Int. Cl.² .................................... B65G 69/24
[52] U.S. Cl. .................................... 14/71.3
[58] Field of Search .................................... 14/71.3, 69.5

[56] References Cited

U.S. PATENT DOCUMENTS

| Re. 25,249 | 10/1962 | Kelley | 14/71.3 |
|---|---|---|---|
| 3,117,332 | 1/1964 | Kelley | 14/71.3 |
| 3,316,575 | 5/1967 | Larsen | 14/71.3 |
| 3,334,368 | 8/1967 | McIntosh | 14/71.3 |
| 3,537,120 | 11/1970 | Alten | 14/71.3 |
| 3,646,627 | 3/1972 | Potter | 14/71.3 |
| 3,699,601 | 10/1972 | Hecker | 14/71.3 |
| 3,902,213 | 9/1975 | Pfleger | 14/71.3 |

*Primary Examiner*—Nile C. Byers
*Attorney, Agent, or Firm*—Blanchard, Flynn, Thiel, Boutell & Tanis

[57] ABSTRACT

A dock leveler having a ramp structure hingedly mounted on a support structure for swinging movement about a substantially horizontal hinge axis. A lifting mechanism coacts between the structures for normally urging the ramp structure to swing upwardly about the axis. A releasable holding means coacts between the structures for normally preventing upward swinging movement of the ramp structure. The holding means including a one-way latch device for permitting downward swinging movement of the ramp structure while restricting upward movement thereof. The holding means includes torsion spring means operatively coacting between the latch device and one of the structures for permitting upward swinging movement of the ramp structure through a limited angular extent even when the latch device is in a latched position in response to imposition of an external lifting force on the ramp structure.

19 Claims, 10 Drawing Figures

TORSION HOLD-DOWN

FIELD OF INVENTION

This invention relates to a dock leveler and, more particularly, to an improved hold-down device connected between the frame and the ramp for maintaining the latter substantially in a selected position while permitting the ramp to swing upwardly a limited amount to compensate for a change in the elevation of a truck bed.

BACKGROUND OF THE INVENTION

Most dock levelers or dock boards are installed in a pit formed in a dock. The leveler includes a ramp or deck hinged at its rear edge to a frame and an extension lip hinged to the front edge of the ramp. Due to the weight of the ramp, a spring-urged life arm is employed to bias the ramp upwardly to an inclined position, while a releasable hold-down mechanism normally connects the frame with the ramp and thereby holds the ramp against upward movement. When not in use, the ramp is held in a cross-traffic position in which the ramp is flush with the upper surface of the dock. Before a truck or other carrier is moved up to the dock, the operator manually releases the hold-down mechanism so that the lift arm pivots the ramp upwardly to an inclined position. As a consequence of the upward pivotal movement of the ramp, a mechanism is actuated to pivot the ramp lip upwardly and outwardly to an extended position. The operator then walks outwardly on the inclined ramp, and his weight overcomes the upward force of the lift arm to lower the ramp and move the lip into engagement with the truck bed. This conventional hold-down mechanism is arranged so that the ramp can be moved downwardly without restraint, yet engagement of the hold-down mechanism prevents upward movement of the ramp or, in the alternative, permits upward movement of the ramp through only a limited extent as permitted by a compression spring associated with the hold-down mechanism.

While many hold-down mechanisms are known which operate generally in the above described manner, nevertheless these known structures have generally possessed structural and/or operational disadvantages which have resulted in these structures performing in less than an optimum manner. For example, in some of the known mechanisms, while the hold-down mechanism may perform in a highly desirable manner when subjected to certain types of loads or when in specific positions, nevertheless these mechanisms do not result in optimum performance when subjected to loads of other magnitudes or when disposed in other operational position.

Accordingly, it is an object of the present invention to provide an improved hold-down mechanism for a dock leveler, which hold-down mechanism permits the ramp of the leveler to raise when the truck bed raises, as when a load is removed therefrom, which improved hold-down mechanism provides for optimum movement and control of the ramp under the loading and positional requirements experienced by the dock leveler during normal operation thereof.

A further object of the present invention is to provide an improved hold-down mechanism, as aforesaid, which utilizes a resilient device which causes a large hold-down force to be imposed on the ramp when disposed within its working range and engaged with a truck bed, and which decreases the hold-down force when the ramp is lifted upwardly by the truck bed to simplify lifting of the ramp.

Still a further object of the invention is to provide an improved hold-down mechanism, as aforesaid, which utilizes a torsion spring associated with a crank arm, the latter being interconnected through an extendable unidirectional clamping structure to the ramp.

Another object of the invention is to provide an improved hold-down mechanism, as aforesaid, which results in the extendable clamping structure and the crank moving through an over-the-center position when the ramp is moved into its raised uppermost position, whereby the crank is urged against a stop which prevents yielding of the torsion spring.

Still another object of this invention is to provide an improved hold-down mechanism, as aforesaid, which is relatively inexpensive to fabricate, durable and reliable in operation and effective in maintaining the ramp in selected positions including a substantially horizontal cross-traffic position.

SUMMARY OF THE INVENTION

In the present invention, the hold-down mechanism is connected between the ramp and the frame for restricting upward swinging movement of the ramp and for maintaining same in a substantially horizontal cross-traffic position. The hold-down mechanism includes an elongated and extendable connecting link which has a unidirectional clamping device associated therewith. The upper end of the connecting link is connected to the ramp, whereas the lower end of this extendable connecting link is, in the preferred embodiment, joined to a torsion spring device. The unidirectional clamping mechanism enables contraction of the connecting link when the ramp is being moved downwardly, but prevents extension of the connecting link when the ramp is urged upwardly. The torsion spring device includes a prewound torsion spring having one end anchored to the frame and the other end anchored to a rotatable crank, which crank in turn is connected to the lower end of the connecting link. When the ramp rests on a truck bed, the torsion spring permits limited upward swinging movement of the ramp as caused by raising of the truck bed, as when a load is removed therefrom, due to angular displacement of the crank and a corresponding winding of the torsion spring. When the ramp is moved into its uppermost or raised position, the crank arm and the torsion spring pass through a center position, and the crank arm abuts against a fixed stop to prevent the spring from unwinding.

Certain terminology will be used in the following description for convenience in reference only. For example, the words "right", "left", "up", "down" will refer to directions in the drawings to which reference is made. The words "front", "rear", will refer to the dock leveler and parts thereof as appearing in FIG. 1, and will also refer to the direction of swinging movement of the ramp. The words "inwardly", "outwardly", will refer to the geometric center of the dock leveler and designated parts thereof. Said terminology will include the words specifically mentioned, derivatives thereof and words of similar import.

DETAILED DESCRIPTION

Figure 1:
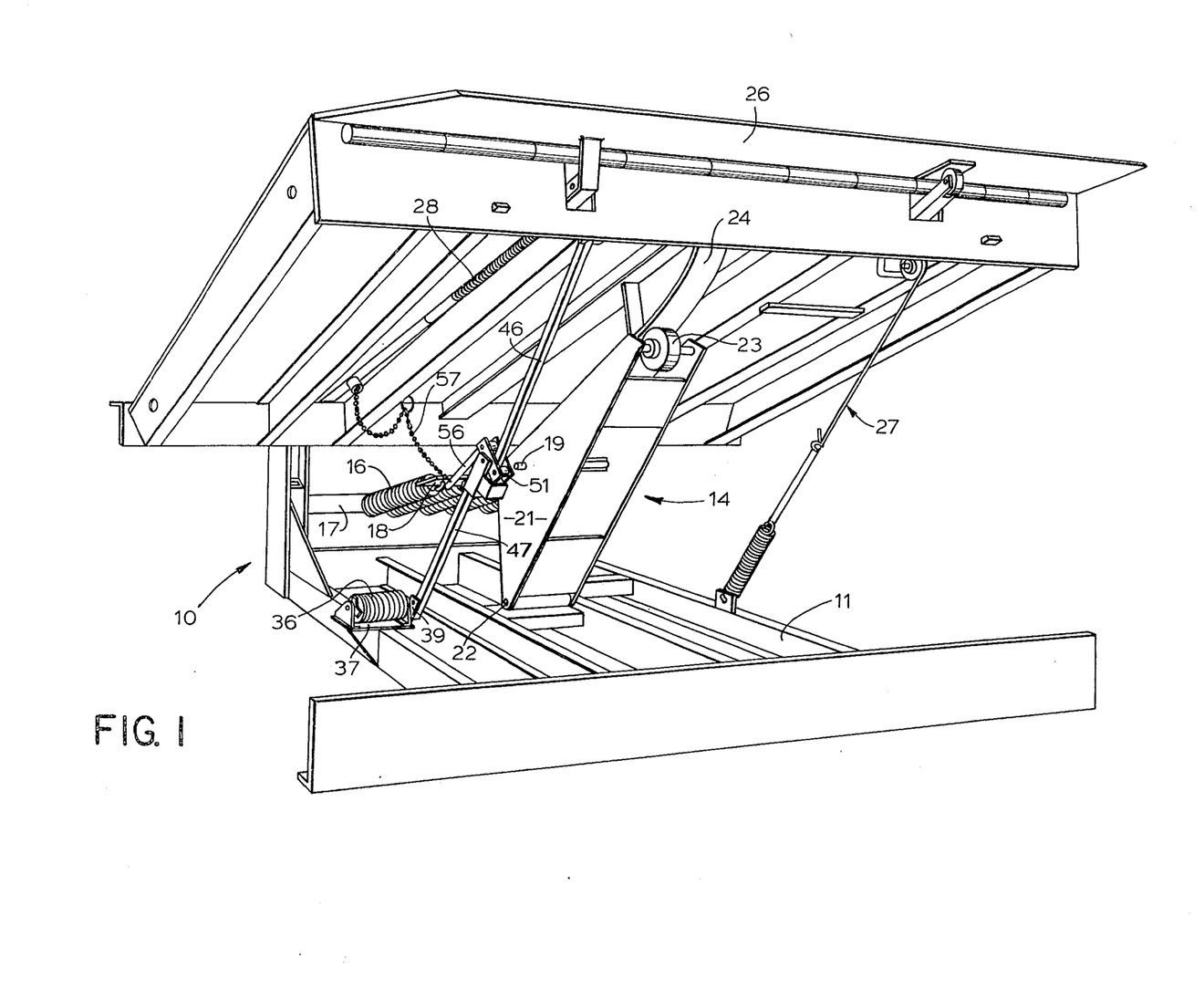
FIG. 1 is a perspective view of a dock leveler in its raised position, and showing the improved hold-down mechanism of the present invention.
Figures 2, 4:
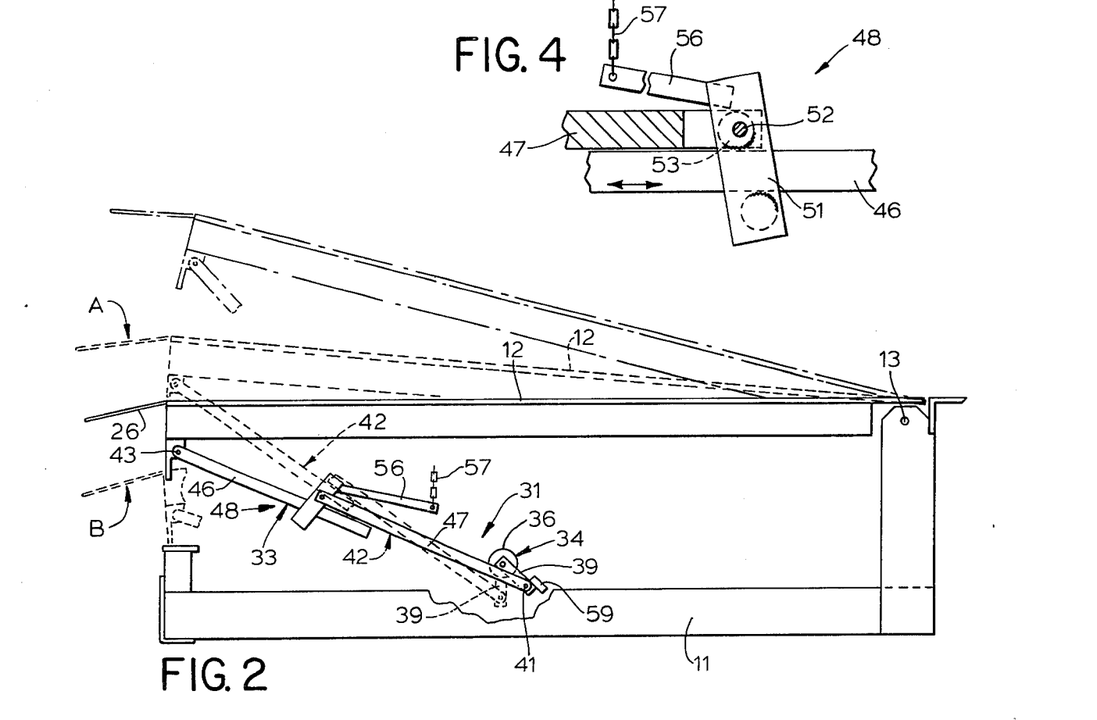
FIG. 2 is a side elevational view of the dock leveler illustrated in its horizontal cross-traffic position.
FIG. 4 is an enlarged, fragmentary cross-sectional view of the unidirectional clamping device associated with the hold-down mechanism.

FIGS. 1 and 2 illustrate therein a pit-type dock leveler or dock board 10 having a rigid base of frame 11 and a ramp or deck 12 which, adjacent its rear edge, is hingedly mounted on the base by hinge pins 13. The ramp 12 is normally maintained in a substantially horizontal position wherein it is substantially flush with the surrounding loading dock.

The ramp 12 is normally urged upwardly by a lift arm mechanism 14 which, as illustrated in FIG. 1, includes a plurality of extension springs 16 having the rearward ends thereof connected to a frame member 17. The forward ends of the springs are connected to a plate 18 which has a forward portion thereof hingedly supported on a hinge pin 19 associated with the lift arm 21. The lower end of this lift arm 21 is hingedly supported on the frame by pins 22. a cam roller 23 is rotatably supported adjacent the upper end of the lift arm, which cam roller rollingly bears against a ramp-like cam 24 fixed to the underside of the ramp 12. The lift arm mechanism 14 resiliently urges the ramp 12 to swing upwardly (clockwise in FIG. 2) so that it assumes an uppermost raised position substantially as illustrated by the uppermost dash-dot line position in FIG. 2. The force generated by the spring-urged lift arm mechanism 14 is sufficient to sustain the ramp in this raised position, but is not sufficient to sustain a 150 pound weight positioned on the ramp adjacent the forward edge thereof. Thus, the ramp 12 may be walked down from its raised position into a lowered position, such as by a man walking on the ramp 12 from the rear toward the front thereof.

As is conventional, the dock leveler is provided with a lip plate 26 hinged to the forward edge of the ramp, which lip plate normally hangs downwardly in a pendant gravity position. This lip plate is actuated to swing outwardly into an extended position when the ramp 12 swings upwardly and approaches its upper position, and for this purpose the dock leveler is provided with a conventional lip actuating mechanism 27 which operates in a conventional manner. The swinging of the lip plate 26 is further assisted by a conventional counterbalance mechanism which, as illustrated in FIG. 1, includes a compression spring 28 which has its rearward end affixed to the ramp and its forward end affixed to an arm which is secured to and projects downwardly from the lower side of the lip plate.

The structure of the dock leveler, as briefly described above, is conventional and further description of same is not believed necessary. Reference is made to U.S. Pat. Nos. 3,235,896 and 3,882,563, wherein much of the above-mentioned structure is described in greater detail.

According to the present invention, the dock leveler 10 is provided with an improved hold-down mechanism 31 which, as illustrated in FIGS. 1 and 2, is connected between the base 11 and the ramp 12. This hold-down mechanism 31 operates in the usual manner in that it normally prevents the ramp 12 from being pivoted upwardly by the lift-arm mechanism 14, whereas it automatically allows the deck 12 to pivot downwardly.

The hold-down mechanism 31 includes an elongated arm or link structure 33 which is connected at its upper end to the ramp, and at its lower end is connected to a resilient device 34. This resilient device in turn is mounted on and coacts with the stationary frame 11.

Figure 3:
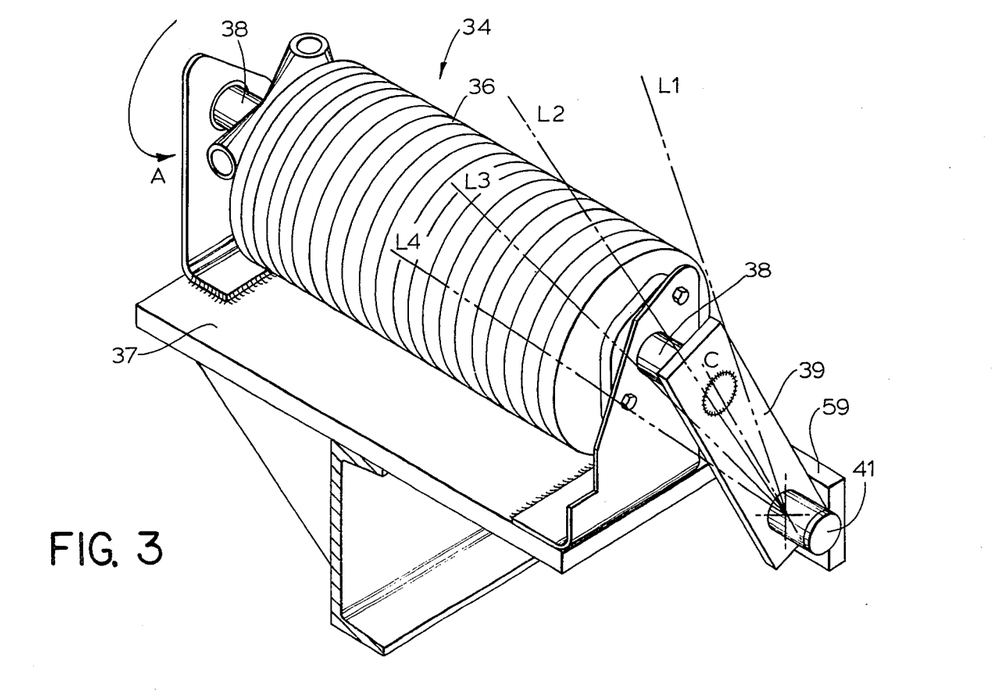
FIG. 3 is an enlarged perspective view of the resilient device associated with the hold-down mechanism.

As illustrated in FIGS. 1-3, the resilient device 34 includes a prestressed torsion spring 36 positioned between the upstanding legs of a U-shaped mounting bracket 37, the latter being fixedly secured to the frame. The legs of the mounting bracket 37 rotatably support thereon a horizontally elongated shaft 38 which extends parallel to the hinge pins 13. The torsion spring 36 is disposed in surrounding relationship to the shaft 38, and one end of the torsion spring 36 is anchored with respect to the shaft 38, and the other end of the torsion spring 36 is anchored with respect to the stationary mounting bracket 37. The torsion spring 36 is initially prewound (that is prestressed) such that it tends to unwind in a counterclockwise direction as viewed in FIGS. 2 and 3, whereby the spring thus continuously exerts a resilient counterclockwise torque on the rotatable shaft 38.

The arm structure 33 is connected between the rotatable shaft 38 and the ramp 12. This arm structure includes a crank arm 39 which is fixed to one end of the shaft 38 and extends radially therefrom. A crank pin 41 is provided adjacent the radially outer end of the arm 39 and is pivotly connected to the lower end of an elongated extendable and contractable line 42, which link has its upper end hinged at 43 to the underside of the ramp 12 adjacent the front edge thereof. This line 42 includes upper and lower rod-like parts 46 and 47, respectively, which are slidable with respect to one another in the longitudinal direction of the line and are suitably joined together by a unidirectional clamping means 48 which restricts extension of the link 42 and hence upward movement of the ramp 12.

The illustrated embodiment of the clamping means 48, as shown in FIG. 4, includes a ring-like yoke 51 which is hingedly connected at 52 to the upper end of the lower part 47. This yoke 51 has a pair of spaced locking members 53 and 54 disposed in the interior thereof which locking members in this embodiment comprise substantially cylindrical cams which are fixed to the yoke and are provided with a toothed or serrated locking surface on the periphery thereof. These locking members 51 and 52 are suitably spaced apart so as to permit the lower end of the upper rod-like part 46 to be slidably inserted therebetween, with the opposite sides of this part 46 being adapted to be grippingly engaged by the serrated gripping surfaces provided on the locking members. Yoke 51 additionally has an elongated handle 56 fixed thereto and projecting outwardly therefrom, which handle has an elongated flexible actuating chain 57 connected thereto. This actuating chain 57 extends upwardly through the ramp and terminates in a ring (not shown) which is located adjacent the rearward end of the ramp and is manually accessible so as to permit pulling of the chain 57, which in turn results in pivoting of the yoke 51 so as to release the clamping means 48.

The frame 11 has a suitable stop member 59 secured thereto which stop member is positioned for engagement with the free end of the crank arm 39. The prestressed torsion spring 36 continuously urges the crank arm 39 in a direction toward the stop 59.

OPERATION

The operation of the hold-down device 31 will be briefly described to insure a proper understanding thereof.

The dock leveler is normally maintained in its stored cross-traffic position wherein the ramp extends substantially horizontally, as illustrated by solid lines in FIG. 2. When in this position, the torsion spring 36 urges the crank arm 39 into an engagement with the stop 59. The unidirectional clamping means 48 also grippingly engages the parts 46 and 47 so that the elongated link 42 is thus prevented from extending, so that the ramp 12 is thus held stationary in its substantially horizontal storage position. When in this position, the lift arm mechanism 14 continuously exerts an upward lifting force on the ramp, which force in turn tends to pull the upper part 46 outwardly through the yoke 51. However, this tendency of the part 46 to move outwardly (right within FIG. 4) tends to urge the yoke 51 to swing in a clockwise direction which thus moves the locking members 53 and 54 into gripping engagement with the part 46, thereby preventing extension of link 41. In this manner, the clamping means 48 thus prevents extension of link 42, and hence prevents the ramp from being moved upwardly due to the urging of the lifting mechanism 14. Further, when in this storage position, the longitudinal center line of the link part 47 extends substantially along the line L3 illustrated in FIG. 3, so that this link is thus positioned below the rotational axis of the shaft 38. In addition, the ramp 12 can be angularly moved a limited extent both above and below this horizontal position without disturbing this latter-mentioned relationship. For example, if the free edge of the ramp is displaced upwardly to position "A" or downwardly to position "B" from this horizontal position through a distance of approximately 12 inches, then the longitudinal center line of the link part 47 will extend along the lines L2 and L4, respectively, which lines are disposed below the rotational axis of the shaft 38. The hold-down mechanism 31 thus permits the ramp to be held in a horizontal position, or in positions slightly upwardly or downwardly from this horizontal position, in opposition to the resilient upward urging imposed on the ramp by the lift mechanism 14.

To release the hold-down mechanism 31, a ring (not shown) associated with the free end of the chain 57 is manually gripped and the chain is pulled upwardly, thereby permitting lifting of the handle 56, which thus causes pivoting of the yoke 51 (clockwise in FIG. 4) about the hinge pin 52. The locking members 53 and 54 thus release the upper link part 46, whereupon same can then slide freely through the yoke 51 to permit extension of the link 42 in response to upward urging of the lift arm mechanism 14.

During this upward swinging of the ramp, the lip plate 26 is extended so as to be substantially flush with the ramp when the latter reaches its raised uppermost position as illustrated by dash-dot lines in FIG. 2. When the ramp reaches this raised uppermost position, the operator can then release the chain 57 to enable the yoke 51 to swing, by gravity, in a counterclockwise direction as viewed in FIG. 4, thereby reactivating the unidirectional clamping means 48. Further, when in this raised uppermost position, the longitudinal center line of the link part 47 now extends along the line L1, which line is disposed above the rotational axis of the shaft 38. Thus, when the ramp approaches its raised uppermost position, the center line of the lower link part 47 passes through the rotational axis of the shaft 38 so that the torsion spring 36 now assists the lift mechanism 14 in holding the ramp in its uppermost position, whereas when the lower link part 47 is disposed below the axis of shaft 38 (as illustrated by lines L2, L3 and L4), the torsion spring opposes the lifting force of the lift arm mechanism 14. Since the crank 39 is urged by the torsion spring 36 against the stop 59 when the ramp is in this uppermost position, unwinding of the spring 36 and movement of the crank 39 is positively precluded.

The ramp 12 can then be walked down into an operational position wherein the lip 26 engages the truck bed, which operational position will normally be within the angular limits defined by the dotted line positions A and B illustrated in FIG. 2. During this downward swinging of the ramp, the upper link part 46 can freely slide inwardly (leftwardly in FIG. 4) through the yoke 51 since movement in this direction tends to urge the yoke and the locking members thereon into a released position. Thus, the link 42 contracts during this downward swinging movement of the ramp. When the ramp reaches its operational position, the locking members 53 and 54 again grippingly engage the upper link part 46 and prevent extension thereof due to urging of the lift mechanism 14, so that the link 42 is thus prevented from extending, whereby the ramp is thus held in its operation position.

If the truck bed should move downwardly when positioned in engagement with the ramp, as due to loading of the truck, then the upper link part 46 will again slidably move through the yoke 51 so as to result in further contraction of the link 42, inasmuch as the clamping means 48 is unidirectional in that it prevents only extension of the link 42.

On the other hand, if the truck bed should move upwardly when engaged with the ramp, as due to removal of a load from the truck, then the clamping means 48 prevents extension of the link 42. Thus, the upward lifting force imposed by the truck bed on the ramp is transmitted through the link 42 (which in this case acts as a rigid link) and is imposed on the crank 39, thereby causing the crank 39 to be swung in a clockwise direction away from the stop 59 (as illustrated by dotted lines in FIG. 2) in opposition to the resilient urging of the torsion spring 36. Thus, the torsion spring is wound even further than its initial prewind, whereby the spring 36 thus acts through the link 42 so as to continually urge the ramp 12 downwardly so that the lip 26 thus remains in snug engagement with the truck bed.

One of the significant operational advantages which results from the hold-down mechanism 31 is that a great holding power is achieved when the ramp is in its working range. For example, when the ramp is engaged with a truck bed and is in or adjacent its horizontal position, the crank arm 39 and the link 42 (which extends along line L2) extend at a small acute angle with respect to one another, which angle is preferably approximately ten degrees. This angular relationship results in the holding power (that is, the force transmitted through the link 42) being equal to the prewind tension of the spring 36 (as imposed on the crank 39) divided by the sine of ten degrees. Thus the holding power or force as transmitted through the link 42 is approximately 5.7 times the spring tension which is imposed on the crank pivot pin 41. Thus, this hold-down mechanism exerts a substantially large and magnified holding force on the ramp when the latter is within its working range in engagement with a truck bed. However, as the truck bed lifts the ramp higher, as when a truck is being unloaded, this causes angular displacement of the crank 39 so that the acute angle between the crank 39 and the link 42 increases, whereby the power magnification achieved through the hold-down mechanism thus substantially decreases, even though the tension in the torsion spring 36 increases due to the additional angular displacement thereof. Thus, the higher the truck bed lifts the ramp, the easier the ramp lifts.

This mode of operation, as described above, differs greatly from that of prior hold-down mechanisms which conventionally utilize a compression spring mounted in a telescoping tubular structure. These known arrangements extend during lifting of the ramp by the truck bed, which extension results in an increase in the spring force (and of the holding power) proportional with the amount of extension.

Thus, the present invention permits the development of maximum holding power when the ramp is in its working range, while also allowing the hold-down to pass over center to position L1 when yieldability is not needed.

MODIFICATIONS

Figure 5:
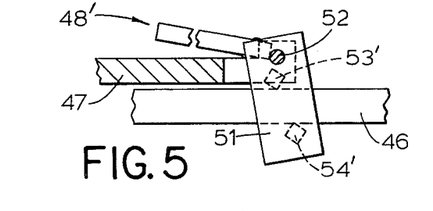
FIGS. 5–7 are views similar to FIG. 4 but illustrating modified unidirectional clamping devices which can be incorporated into the hold-down mechanism of the present invention.

FIG. 5 illustrates a modified clamping means 48' which is identical to the clamping means 48 except that the locking members 53' and 54' are formed as substantially square or rectangular elements positioned such that the opposed corners thereof are disposed for gripping engagement with the opposite surfaces of the upper link part 46.

Figure 6:
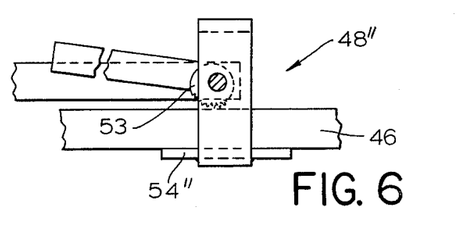

FIG. 6 illustrates a further variation of a clamping means 48" which is identical to the clamping means 48 except that the lower locking element 54 (of FIG. 4) has been replaced by a flat plate-like locking element 54". This plate 54" functions as a slidable guide for the upper link part 46 and also acts as a friction engaging plate for holding the link part 46 when the opposite locking element 53 is moved into gripping engagement therewith.

Figure 7:
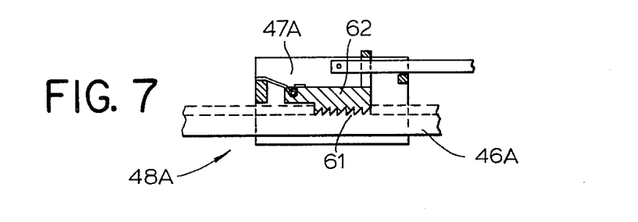

Still a further modification of a clamping means 48A is illustrated in FIG. 7 wherein the upper link part 46A is provided with teeth 61 thereon. The other link part 47A has a toothed pawl 62 hingedly mounted thereon and spring urged in a direction so as to engage the teeth 61. The cooperation between pawl 62 and teeth 61 provides locking in one direction, whereas they permit free relative sliding movement of the bar 46A in the opposite direction, as when the hold-down link is being contracted.

Each of the modified clamping means 48', 48" and 48A, as described above, can be incorporated into the hold-down mechanism 31 of the present invention, in place of the clamping means 48 illustrated in FIG. 4. All of these clamping means result in the hold-down mechanism operating in substantially the same manner.

Figure 8:
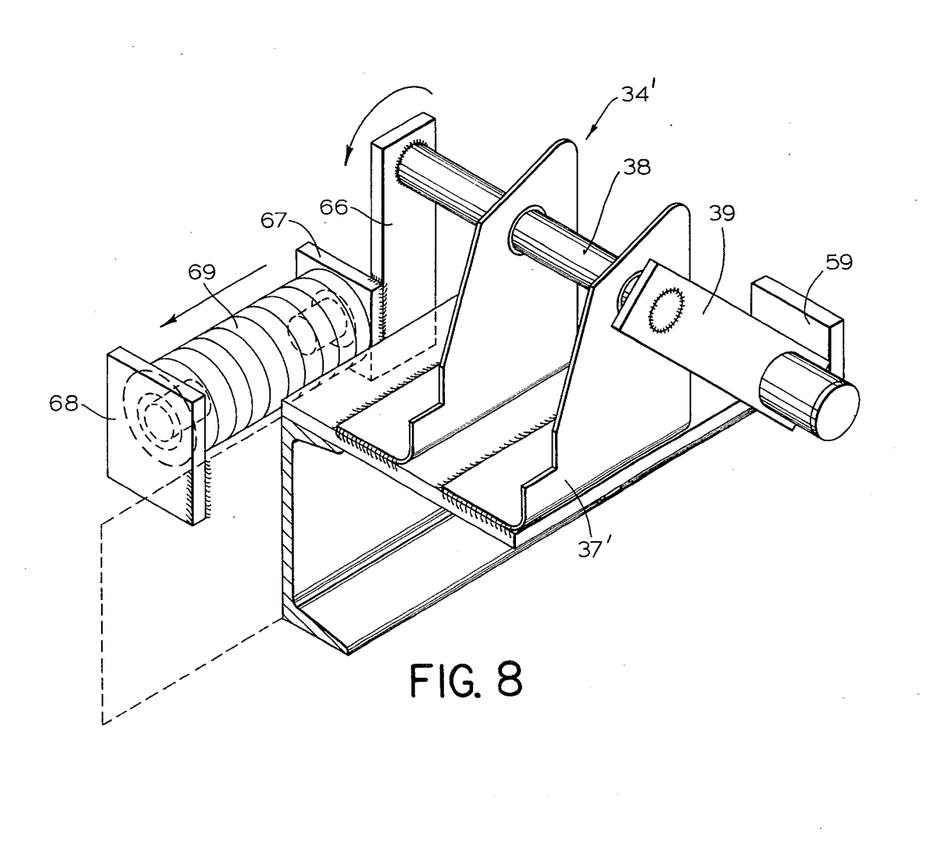
FIG. 8 is a view similar to FIG. 3 but illustrating a modification of the resilient device.

Considering now FIG. 8, same illustrates a modified resilient device 34' which is structurally similar to the device 34 of FIG. 3. More specifically, the device 34' does not utilize a torsion spring disposed in surrounding relationship to the shaft 38. Rather, the opposite end of shaft 38 is provided with a further crank arm 66 fixedly secured thereto, which crank arm has a spring pad or seat 67 fixed thereon as by welding. A further spring pad 68 is disposed opposite and spaced from the pad 67, and is fixedly secured with respect to the frame. These pads 67 and 68 confine a conventional compression apring 69 therebetween, which spring is maintained in an initially compressed and hence prestressed condition. The spring 69 resiliently urges the shaft 38, and hence the crank 39, in a counterclockwise direction so that the crank 39 is thus urged into engagement with the stop 59. The resilient device 34' thus functions in the same manner as the device 34, as described above.

Figure 9:
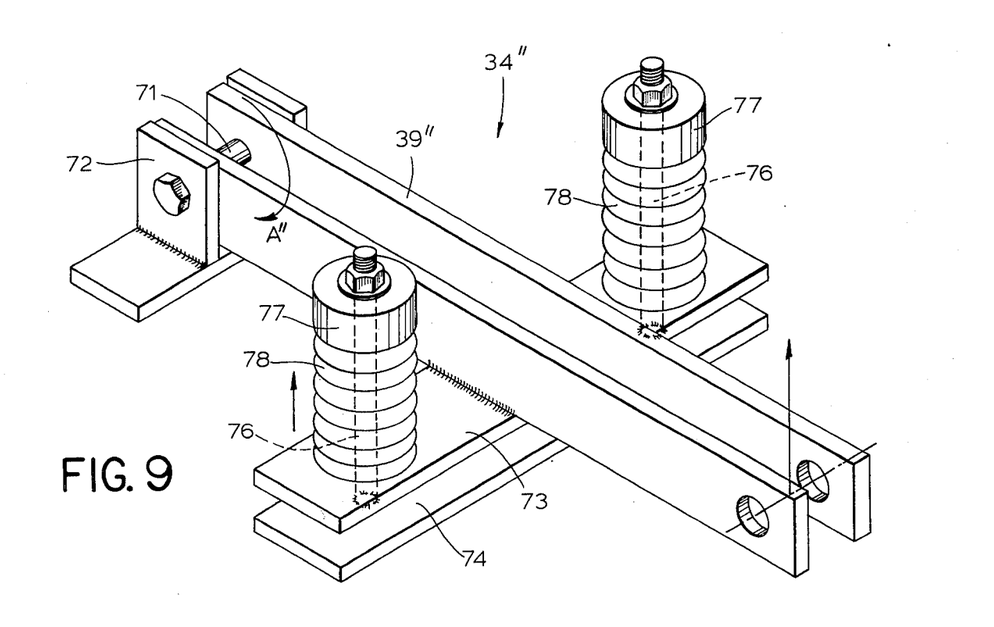
FIG. 9 is a perspective view illustrating still a further modification of the resilient device.
Figure 10:
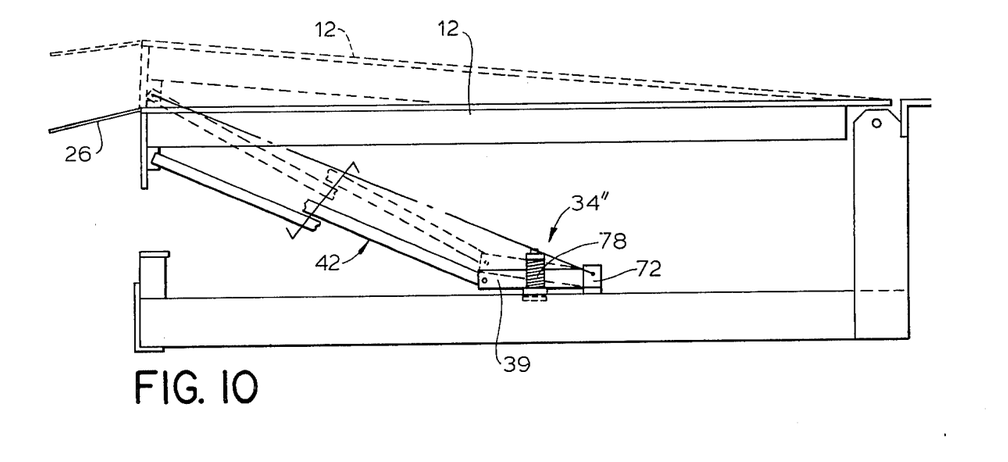
FIG. 10 is a side elevational view of a dock leveler incorporating therein the resilient device of FIG. 9.

FIGS. 9 and 10 illustrate still a further modified resilient device 34" wherein the crank arm 39" has one end hinged by a suitable bolt or pin 71 to a stationary yoke 72, the latter being fixedly secured with respect to the frame. A first plate 73 is fixedly secured to the crank arm 39" in radially spaced relationship from the hinged pin 71, which plate 73 is disclosed opposite a further plate 74 which is fixedly secured with respect to the frame. A pair of elongated pins 76 are fixed to the plate 74 and project upwardly therefrom, which pins extend through suitable openings formed in the plate 73. Enlargements 77 are fixed to the upper ends of the pins 76, and compression springs 78 are disposed in surrounding relationship to the pins 76 and are confined between the enlargements 77 and the plate 73. These springs 78 urge the crank 39" downwardly into a position wherein the plate 73 is maintained in engagement with the lower plate 74, in which position the springs 78 are still in a prestressed condition. The operation of this embodiment is believed self-evident from inspection of FIGS. 9 and 10, when considered with the operational description set forth above with respect to the previously described embodiments.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a dock leveler having a support structure, a ramp structure hingedly mounted on said support structure for swinging movement about a substantially horizontal hinge axis, a lifting mechanism coacting between said structures for normally urging said ramp structure to swing upwardly about said axis, and a releasable holding means coacting between said structures for normally preventing upward swinging movement of said ramp structure, said holding means including a one-way latch device for permitting downward swinging movement of said ramp structure while restricting upward movement thereof, comprising the improvement wherein said holding means includes torsion spring means operatively coacting between said latch device and one of said structures for permitting upward swinging movement of said ramp structure through a limited angular extent even when said latch device is in a latched position in response to imposition of an external lifting force on said ramp structure.

2. A dock leveler according to claim 1, wherein said latch device includes elongated link means having one end connected to said torsion spring means and the other end connected to said other structure, said elongated link means being extendable and contractable and including first and second parts which can be relatively slidably displaced to lengthen and shorten said link means, said latch device also including releasable clamping means cooperating between said first and second parts for normally fixedly locking same together to prevent extension of said link means.

3. A dock leveler according to claim 2, wherein said holding means includes a swingable crank supported for angular displacement about an axis substantially parallel to said hinge axis, said torsion spring means including a torsion spring having one end thereof anchored with respect to said one structure and the other end thereof anchored with respect to said crank, and said crank being hingedly connected to said one end of said link means.

4. A dock leveler according to claim 3, wherein said torsion spring has the one end thereof anchored with respect to said frame structure, and wherein the other end of said link means is hingedly connected to said ramp structure in the vicinity of the free edge thereof.

5. A dock leveler according to claim 1, wherein said holding means includes means connecting said torsion spring means to said latch device for causing the downward holding force as imposed on said ramp structure by said spring means to be decreased when said ramp structure, when in an approximately horizontal working position, is swung upwardly due to application of an external lifting force thereto.

6. A dock leveler according to claim 5, wherein said connecting means comprises a crank arm connected to said spring means and swingable about an axis which is substantially parallel with said hinge axis, said spring means exerting a resilient torque on said crank arm, and said latch device included elongated extendable and contractable link means connected between said crank arm and said other structure, said crank arm and said elongated link means defining a small acute included angle therebetween when the ramp structure is in a horizontal position so that the spring force as applied to said crank arm is magnified when transmitted through said link means due to said small angle, said angle increasing as said ramp structure is swung upwardly by application of an external lifting force thereto so that the holding force on the ramp structure as transmitted through the link means decreases even though the spring force increases.

7. A dock leveler according to claim 6, wherein said acute angle is approximately ten degrees.

8. In a dock leveler having a support structure, a ramp structure hingedly mounted on said support structure for swinging movement about a substantially horizontal hinge axis, a resilient lifting mechanism coacting between said structures for normally urging said ramp structure to swing upwardly about said hinge axis, and a releasable holding means coacting between said structures and acting in opposition to said lifting mechanism for normally restraining upward swinging movement of said ramp structure, said holding means including a one-way latch device for permitting downward swinging movement of said ramp structure while restricting upward movement thereof, the improvement wherein said holding means comprises crank means supported on one of said structures for swinging movement about a pivot axis, spring means coacting with said crank means for normally resiliently urging same to be swingably displaced in a first rotational direction, and elongated extendable and contractable link means pivotally connected between said crank means and the other of said structures, said latch device being associated with said elongated link means for normally maintaining same in a locked condition which prevents extension of said link means.

9. A dock leveler according to claim 8, wherein said pivot axis extends substantially parallel to said hinge axis, and wherein said spring means coacts between said crank means and said one structure.

10. A dock leveler according to claim 9, wherein said crank means and said link means define a small included acute angle therebetween when said ramp structure is in a horizontal position.

11. A dock leveler according to claim 10, wherein said spring means urges said crank means to be rotatably displaced in a direction which results in the holding means imposing a force on the ramp structure which urges the ramp structure to swing downwardly.

12. A dock leveler according to claim 10, wherein said spring means comprises a spirally wound torsion spring.

13. A dock leveler according to claim 10, including stop means fixedly associated with said one structure and coacting with said crank means, said spring means normally rotatably urging said crank means into engagement with said stop means.

14. A dock leveler according to claim 6, wherein said crank arm is pivotally supported at one end thereof on said support structure and is hingedly connected at the other end thereof to one end of said extendable and contractable link means, the other end of said extendable and contractable link means being connecting to said ramp structure by a connection which permits pivoting therebetween.

15. A dock leveler according to claim 8, wherein said crank means and said link means are oriented relative to one another so as to define a small included acute angle therebetween when said ramp structure is in a horizontal position, said spring means urging said crank means to be rotatably displaced in a direction which results in the holding means imposing a force on the ramp structure which urges it to swing downwardly, the urging of said crank means in said direction by said spring means also tending to reduce the small acute angle defined between said crank means and said link means, whereby upward swinging of said ramp structure in response to application of an external lifting force causes said crank means to swing in an opposite direction in opposition to the urging of said spring means so that the spring force is increased while the included angle between said crank means and link means is also increased so that the actual downward holding force imposed on said ramp structure is decreased as the ramp structure is swung upwardly.

16. In a dock leveler having a support structure, a ramp structure hingedly mounted on said support structure for swinging movement about a substantially horizontal hinge axis, a lifting mechanism coacting between said structures for normally urging said ramp structure to swing upwardly about said axis, and a releasable hold-down mechanism coacting between said structures for normally preventing upward swinging movement of said ramp structure, said hold-down mechanism being independent of said lifting mechanism and including a one-way latch device for permitting downward swinging movement of said ramp structure while restricting upward swinging movement thereof, comprising the improvement wherein said hold-down mechanism includes means operatively coacting between said latch device and one of said structures for imposing a downward holding force on said ramp structure when it is in an approximately horizontal working position, said means causing said downward holding force as imposed on said ramp structure to progressively decrease as said ramp structure is swung upwardly away from said approximately horizontal working position due to application of an external lifting force thereto, and said means including spring means which develops a spring force which increases as the ramp structure is swing upwardly away from said approximately horizontal working position.

17. A dock leveler according to claim 16, wherein said means for imposing a downward holding force on said ramp structure includes a swingable crank, said spring means coacting with said crank for urging same to be swingably displaced in one direction, said crank being swingable in the opposite direction in response to upward swinging of said ramp structure away from said approximately horizontal working position.

18. A dock leveler according to claim 17, including elongated extendable and contractable link means connected between said crank and one of said structures, said latch device cooperating with said link means to normally prevent extension thereof.

19. A dock leveler according to claim 16, wherein said means includes a linkage hingedly connected between said support and ramp structures, said latch device being associated with said linkage, said linkage including a swingable crank having one end thereof hingedly supported on one of said structures and hingedly connected adjacent the other end thereof to elongated link means which is hingedly connected to the other of said structures, said spring means being operatively connected to said linkage for imposing said spring force thereon so that said linkage then imposes said downward holding force on said ramp structure.

* * * * *